US008252478B2

(12) United States Patent
Larsen et al.

(10) Patent No.: US 8,252,478 B2
(45) Date of Patent: Aug. 28, 2012

(54) REDOX-STABLE ANODE

(75) Inventors: Peter Halvor Larsen, Roskilde (DK);
Charissa Chung, Loughborough (GB);
Mogens Mogensen, Lynge (DK)

(73) Assignee: Technical University of Denmark, Kgs. Lyngby (DK)

( * ) Notice: Subject to any disclaimer, the term of this patent is extended or adjusted under 35 U.S.C. 154(b) by 527 days.

(21) Appl. No.: 11/815,025

(22) PCT Filed: Jan. 31, 2006

(86) PCT No.: PCT/EP2006/000813
§ 371 (c)(1),
(2), (4) Date: Oct. 5, 2007

(87) PCT Pub. No.: WO2006/079558
PCT Pub. Date: Aug. 3, 2006

(65) Prior Publication Data
US 2008/0166618 A1 Jul. 10, 2008

(30) Foreign Application Priority Data

Jan. 31, 2005 (DK) .................................. 2005 00143

(51) Int. Cl.
*H01M 4/86* (2006.01)
*H01M 4/88* (2006.01)
(52) U.S. Cl. ......... 429/488; 429/489; 429/533; 264/618
(58) Field of Classification Search .................... 429/45, 429/488, 489, 533; 264/618
See application file for complete search history.

(56) References Cited

U.S. PATENT DOCUMENTS

| 3,023,492 | A | | 3/1962 | Bristow |
| 4,209,147 | A | | 6/1980 | Jones, Jr. |
| 4,702,971 | A | | 10/1987 | Isenberg |
| 4,957,673 | A | | 9/1990 | Schroeder et al. |
| 5,021,304 | A | | 6/1991 | Ruka et al. |
| 5,058,799 | A | | 10/1991 | Zsamboky |
| 5,064,734 | A | | 11/1991 | Nazmy et al. |
| 5,162,167 | A | | 11/1992 | Minh et al. |
| 5,358,735 | A | | 10/1994 | Kawasaki et al. |
| 5,368,951 | A | * | 11/1994 | Shiratori et al. ............ 429/45 X |
| 5,670,270 | A | | 9/1997 | Wallin et al. |
| 5,702,837 | A | | 12/1997 | Xue |
| 5,788,788 | A | | 8/1998 | Minh |
| 5,803,934 | A | | 9/1998 | Carter |
| 5,846,664 | A | | 12/1998 | Third et al. |
| 5,908,713 | A | | 6/1999 | Ruka et al. |
| 6,017,647 | A | | 1/2000 | Wallin |
| 6,048,636 | A | | 4/2000 | Naoumidis et al. |
| 6,099,985 | A | | 8/2000 | Elangovan et al. |
| 6,191,510 | B1 | | 2/2001 | Landlin et al. |
| 6,232,009 | B1 | | 5/2001 | Batawi |
| 6,248,468 | B1 | | 6/2001 | Ruka et al. |
| 6,280,868 | B1 | | 8/2001 | Badwal et al. |
| 6,458,170 | B1 | | 10/2002 | Visco et al. |
| 6,479,183 | B2 | * | 11/2002 | Tsukuda et al. ............ 429/45 X |
| 6,592,787 | B2 | | 7/2003 | Pickrell et al. |
| 6,605,316 | B1 | | 8/2003 | Visco et al. |
| 6,682,842 | B1 | | 1/2004 | Visco et al. |
| 6,783,880 | B2 | | 8/2004 | Christiansen |
| 6,843,960 | B2 | | 1/2005 | Krumpelt et al. |
| 6,844,099 | B1 | | 1/2005 | Gorte et al. |
| 6,878,651 | B2 | | 4/2005 | Crosbie |
| 6,936,217 | B2 | | 8/2005 | Quadadakkers et al. |
| 6,958,196 | B2 | | 10/2005 | Gorte et al. |
| 7,351,488 | B2 | | 4/2008 | Visco et al. |
| 2001/0029231 | A1 | | 10/2001 | Gorte et al. |
| 2002/0045090 | A1 | | 4/2002 | Oyanagi et al. |
| 2002/0048699 | A1 | | 4/2002 | Steele et al. |
| 2002/0122967 | A1 | | 9/2002 | Gorina et al. |
| 2002/0127455 | A1 | | 9/2002 | Pham et al. |
| 2002/0182468 | A1 | | 12/2002 | Janousek et al. |
| 2003/0015431 | A1 | | 1/2003 | Barker et al. |
| 2003/0035989 | A1 | | 2/2003 | Gorte et al. |
| 2003/0040420 | A1 | | 2/2003 | Larsen et al. |
| 2003/0059335 | A1 | | 3/2003 | Quadadakkers et al. |
| 2003/0059668 | A1 | | 3/2003 | Visco et al. |

(Continued)

FOREIGN PATENT DOCUMENTS

CA 2440288 3/2004

(Continued)

OTHER PUBLICATIONS

Computer-generated English translation of the "Detailed Description" of JP-09-274921 (doc. date Oct. 1997).*

(Continued)

*Primary Examiner* — Stephen J. Kalafut
(74) *Attorney, Agent, or Firm* — Michael Best & Friedrich LLP

(57) ABSTRACT

The present invention provides a method of producing a solid oxide fuel cell, comprising the steps of: forming an anode support layer; applying an anode layer on the anode support layer; applying an electrolyte layer on the anode layer; and sintering the obtained structure; wherein the anode support layer and/or the anode layer comprises a composition comprising doped zirconia, doped ceria and/or a metal oxide with an oxygen ion or proton conductivity, NiO and at least one oxide selected from the group consisting of $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof. According to the invention, a combination of nickel coarsening prevention due to specific Ni-particle growth inhibitors, and, at the same time, a strengthening of the ceramic structure of the anode support layer and/or the anode layer is achieved.

10 Claims, No Drawings

U.S. PATENT DOCUMENTS

| | | |
|---|---|---|
| 2003/0082434 A1 | 5/2003 | Wang et al. |
| 2003/0134171 A1 | 7/2003 | Sarkar et al. |
| 2003/0145525 A1 | 8/2003 | Rosenflanz |
| 2003/0165726 A1 | 9/2003 | Robert et al. |
| 2003/0178307 A1 | 9/2003 | Sarkar |
| 2003/0186101 A1 | 10/2003 | Christansen et al. |
| 2003/0224234 A1 | 12/2003 | Steele et al. |
| 2003/0231973 A1 | 12/2003 | Krumpelt et al. |
| 2003/0232230 A1 | 12/2003 | Carter et al. |
| 2003/0235752 A1 | 12/2003 | England et al. |
| 2004/0033405 A1 | 2/2004 | Barnett et al. |
| 2004/0043269 A1 | 3/2004 | Taniguchi et al. |
| 2004/0053101 A1 | 3/2004 | Chartier et al. |
| 2004/0060967 A1 | 4/2004 | Yang et al. |
| 2004/0115503 A1 | 6/2004 | Jacobson et al. |
| 2004/0169064 A1 | 9/2004 | Rinne et al. |
| 2004/0173666 A1 | 9/2004 | Fukunaga et al. |
| 2004/0183055 A1 | 9/2004 | Chartier et al. |
| 2004/0209147 A1 | 10/2004 | Finkenwirth et al. |
| 2005/0064220 A1 | 3/2005 | Hasz |
| 2005/0089739 A1 | 4/2005 | Seccombe et al. |
| 2005/0181253 A1 | 8/2005 | Finnerty et al. |
| 2006/0024547 A1 | 2/2006 | Waldbillig et al. |
| 2006/0147782 A1 | 7/2006 | Reisdorf et al. |
| 2006/0234100 A1 | 10/2006 | Day et al. |
| 2006/0257703 A1 | 11/2006 | Qi et al. |
| 2006/0280998 A1 | 12/2006 | Ying et al. |
| 2007/0040003 A1 | 2/2007 | Rinne et al. |
| 2007/0269701 A1 | 11/2007 | Larsen et al. |
| 2008/0096079 A1 | 4/2008 | Linderoth et al. |
| 2008/0118635 A1 | 5/2008 | Larsen |
| 2008/0124602 A1 | 5/2008 | Larsen et al. |
| 2008/0142148 A1 | 6/2008 | Nielsen et al. |

FOREIGN PATENT DOCUMENTS

| | | |
|---|---|---|
| CA | 2596173 | 8/2006 |
| CN | 1409427 | 4/2003 |
| CN | 1997229 | 7/2007 |
| DE | 4237602 | 5/1994 |
| DE | 19650704 | 6/1998 |
| DE | 19710345 | 1/1999 |
| DE | 19836132 A1 | 2/2000 |
| EP | 0446680 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| GB | 1313795 | 4/1973 |
| GB | 2400723 | 10/2004 |
| JP | 02-019406 | 1/1990 |
| JP | 08-222249 | 8/1996 |
| JP | 09-050812 | 2/1997 |
| JP | 9-274921 | 10/1997 |
| JP | 2001335388 | 12/2001 |
| JP | 2002-329508 | 11/2002 |
| JP | 2003-522384 | 7/2003 |
| JP | 2003-528979 | 9/2003 |
| JP | 2003-282068 | 10/2003 |
| JP | 2003-331856 | 11/2003 |
| JP | 2004-119108 | 4/2004 |
| JP | 2004152585 | 5/2004 |
| JP | 2004319286 | 11/2004 |
| JP | 2005-166483 | 6/2005 |
| JP | 2006-049248 | 2/2006 |
| JP | 2006-134611 | 5/2006 |
| KR | 10-0464607 | 1/2005 |
| WO | 92/15122 A1 | 9/1992 |
| WO | WO 98/49738 | 11/1998 |
| WO | WO 99/56899 | 11/1999 |
| WO | 01/57945 | 8/2001 |
| WO | 01/72456 | 10/2001 |
| WO | WO 02/09116 | 1/2002 |
| WO | WO 02/45198 | 6/2002 |
| WO | 02/073729 A2 | 9/2002 |
| WO | 02/073729 A3 | 9/2002 |
| WO | WO 03/036739 | 5/2003 |
| WO | WO 03/069705 | 8/2003 |
| WO | WO 03/075382 | 9/2003 |
| WO | 2004/001885 A1 | 12/2003 |
| WO | WO 03/105252 | 12/2003 |
| WO | WO 2004/013925 | 2/2004 |
| WO | WO 2004/030130 | 4/2004 |
| WO | WO 2004/030133 | 4/2004 |
| WO | WO 2004/079033 | 9/2004 |
| WO | WO 2005/122300 | 12/2005 |
| WO | WO 2006/069753 | 7/2006 |
| WO | WO 2006/074932 | 7/2006 |
| WO | WO 2006/082057 | 8/2006 |
| WO | WO 2007/025762 | 3/2007 |

OTHER PUBLICATIONS

Kim J-H et al: "Fabrication and characteristics of anode-supported flat-tube solid oxide fuel cell" Journal of Power Sources, Elsevier, Amsterdam, NL, vol. 122, No. 2, Jul. 23, 2003, pp. 138-143, XP004437055, ISSN: 0378-7753.

"Anode supported PEN for SOFC—Pressed substrates for spray pyrolysed and co-sintered electrolyte; Redox stability and alternative anode" Jahersbericht Energieforschung, Dec. 15, 2001, pp. 1-6, XP002976650.

Zhang et al: "Redox cycling of Ni-YSZ anode investigated by TPR technique" Solid State Ionics, North Holland Pub. Company. Amsterdam, NL. vol. 176, No. 29-30, Sep. 2005, pp. 2193-2199, XP005053843, ISSN: 0167-2738.

European Patent Office Search Report for European Application No. 062024339 dated Feb. 2, 2007 (2 pages).

International Search Report and Written Opinion from International Searching Authority for PCT/EP2005/013968 dated Mar. 28, 2006 (10 pages).

International Preliminary Report on Patentability from International Searching Authority for PCT/EP2005/013968 dated Mar. 30, 2007 (10 pages).

International Search Report and Written Opinion from International Searching Authority for PCT/EP2006/000229 dated Mar. 15, 2006 (9 pages).

International Search Report and Written Opinion from International Searching Authority for PCT/EP2006/000920 dated Sep. 22, 2006 (10 pages).

International Search Report and Written Opinion from International Searching Authority for PCT/DK2005/000379 dated Dec. 16, 2005 (14 pages).

United States Office Action for U.S. Appl. No. 11/814,356 dated May 1, 2008 (7 pages).

International Search Report from International Searching Authority for PCT/EP2006/008537 dated Aug. 8, 2007 (3 pages).

United States Office Action for U.S. Appl. No. 11/570,320 dated May 26, 2009 (15 pages).

Notice of Allowability with Office Action for U.S. Appl. No. 11/814,356 dated Jul. 6, 2009.

United States Office Action for U.S. Appl. No. 11/814,356 dated Jan. 26, 2009 (7 pages).

Donald, I.W. "Preparation, properties and chemistry of glass and glass-ceramic-to-metal seals and coatings," J. Mat. Sci. (1993) 28:2841-2886.

Dyck, C.R. et al., "Synthesis and characterization of $Gd_{(1-x)}Sr_xCoO_{(1-y)}Fe_yO_{(3-\delta)}$ as a cathode material for intermediate temperature solid oxide fuel cells," Mat. Res. Soc. Symp. Proc. (2004) 801:113-118.

Klemensø, T. et al., "The mechanism behind redox instability of anodes in high-temperature SOFCs," Electrochemical Society Journal (2005) 152(11):A2186-A2192.

Matus, Y. et al., "Metal-supported solid oxide fuel cell membranes for rapid thermal cycling," Solid State Ionics (2005) 176:443-449.

Nadler, J.H. et al., "Oxide reduction and sintering of Fe-Cr alloy honeycombs," J. Mat. Research (2003) 18(8):1787-1794.

Xia, C. et al., "Functionally graded cathodes for honeycomb solid oxide fuel cells," Electrochem. Solid-State Letters (2002) 5(10):A217-A220.

Young, R.C. et al., "Symposium BB: Materials and Technologies for a Hydrogen Economy," Materials Research Society Symposium Proceedings Series (Nov. 30, 2003) pp. 709-717.

International Search Report and Written Opinion from International Searching Authority for PCT/EP2006/000813 dated Mar. 29, 2006 (10 pages).

International Preliminary Report on Patentability from International Searching Authority for PCT/EP2006/000813 dated May 18, 2007 (10 pages).

Han, M-F. et al., "Manufacturing processes of solid oxide fuel cell," China Academic Journal Electronic Publishing House (2001) 10:1195-1198.

United States Patent Office Action for U.S. Appl. No. 11/813,074 dated May 19, 2010 (11 pages).

United States Patent Office Action for U.S. Appl. No. 11/813,074 dated Jan. 10, 2011 (13 pages).

United States Patent Office Action for U.S. Appl. No. 11/944,133 dated Jun. 22, 2011 (14 pages).

United States Patent Office Action for U.S. Appl. No. 11/813,798 dated Jun. 28, 2011 (9 pages).

Japanese Patent Office Action for Application No. 2007-552592 dated Feb. 8, 2011 (8 pages).

United States Patent Office Notice of Allowance for U.S. Appl. No. 11/813,074 dated Apr. 15, 2011 (2 pages).

United States Patent Office Action for U.S. Appl. No. 11/944,133 dated Nov. 2, 2011 (14 pages).

United States Patent Office Action for U.S. Appl. No. 12/065,357 dated Dec. 23, 2011 (9 pages).

United States Patent Office Notice of Allowance for U.S. Appl. No. 11/813,798 dated Aug. 5, 2011 (4 pages).

* cited by examiner

REDOX-STABLE ANODE

CROSS-REFERENCE TO RELATED APPLICATIONS

This patent application is a national stage filing under 35 U.S.C. 371 of International Application No. PCT/EP2006/000813, filed 31 Jan. 2006, which claims foreign priority to Denmark Patent Application No. PA 2005 00143, filed 31 Jan. 2005, the disclosures of which are incorporated by reference herein in their entireties. Priority to each application is hereby claimed.

FIELD OF THE INVENTION

The present invention relates to a solid oxide fuel cell (SOFC) comprising an anode that is able to withstand redox cycling, and to a method to produce said solid oxide fuel cell.

BACKGROUND ART

Generally, solid oxide fuel cells operate at high temperatures in the range of about 750° C. to 1000° C. These high temperatures are challenging to the materials employed, and are of particular concern with regard to the stability of the anode structures. For fuel oxidation, the so far preferred anode material comprises metallic nickel. Nickel is also preferred for hydrocarbon fuel since it is a good catalyst for hydrocarbon reformation.

Nickel oxide cermet structures have been suggested as anode materials for SOFCs for a number of years. Ni-cermet anodes usually have a 3-phase structure formed by nickel particles, ceramic particles (typically yttria stabilised zirconia, YSZ) and pores which are formed during the manufacturing process. The ceramic component of the cermet provides the necessary mechanical strength of the structure. Each of the components of the 3-phase structure furthermore forms a continuous path throughout the entire anode structure so as to provide transportation of electrons, oxide ions and gas, respectively.

However, the suggested anodes do not withstand repeated redox cycling during operation for a longer time without mechanical failure, resulting in the degradation of the electrical cell performance. The degradation is initiated by a coarsening of the nickel particles that takes place by grain growth during operation. If the fuel gas flow is lost during operation, the nickel particles will be oxidised to NiO electrochemically or by air that may penetrate into the anode compartment. The volume increase that is associated with the Ni oxidation causes disruption and crack formation in the ceramic backbone and the electrolyte because there are always volumes in which the porosity is too small to accommodate the resulting volume expansion.

T. Klemmensoe, Charissa Chung, Peter Halvor Larsen and Mogens Mogensen demonstrated in the article "The mechanism behind redox instability of SOFC anodes" that the redox stability of the anode in small and medium scale SOFCs is considered important for safety reasons. The technological aim has been reported to be 5-20 cycles per year during the life time of the cell. The commercial life of 5 years thus equals to a total of 25-100 cycles. However, in the prevalent anode supported design, oxidation of the anode is known to be detrimental for the cell performance. The degradation of redox cycling is believed to be related to bulk expansion of the anode, yet the mechanism behind the process has not previously been investigated. It was further demonstrated that a high strength, as achieved by using zirconia with 3 mole yttria instead of 8 mole, decreased the expansion during oxidation of a Ni—YSZ cermet structure. The article was published in *SOFC IX*, S. C. Singhal and J. Mitzusaki, eds. PV 2005-07, The Elecrtrochemical Society Proceedings Series, Pennington, N.J., 2005.

U.S. Pat. No. 6,099,985 discloses an SOFC comprising an anode which is fabricated from ceria mixed with a nickel oxide/magnesium oxide material to stabilize the nickel against coarsening during high temperature SOFC operation. MgO advantageously forms a single phase with NiO, while showing limited solubility in zirconia and ceria.

However, while the addition of MgO reduces the coarsening of nickel particles to a certain extend, at the same time the difference of the thermal expansion coefficient of the anode layer and electrolyte layer is increased, thereby weakening the overall mechanical stability of the SOFC, especially during heating/cooling cycles.

US-A1-2003/0165726 relates to a structured body for an anode suitable for fuel cells, comprising a structure formed by macro-pores and an electrode material having two reticular systems which intergage. The first system is made of a ceramic material, such as zirconium oxide stabilized with yttrium (YSZ), aluminium oxide, titanium oxide, doped cerium oxide, magnesium oxide, and/or a spinel compound. The second system contains metals, for example Ni derived from NiO, to bring about electrical conductivity, and may further contain MgO as an inhibitor of grain growth. In order to obtain an anode structure, the particles of a ceramic material (e.g. YSZ) and of a metal oxide are put into sufficiently fine form for the formation of the reticular systems by grinding and classification. A homogeneous mixture in the form of a slurry is formed from the particles, the pore forming materials and a liquid. The slurry is cast to form a layer. The slurry is cast in an absorbent mould so that some of the liquid is removed from it. At the same time, a marginal zone arises in which a lack of pore forming materials is present, resulting in an inhomogeneous structure.

However, in US-A1-2003/0165726 an inhomogeneous structure is obtained in which two reticular systems intergage. Thus, the first reticular system comprises a ceramic material and other oxides, and the second reticular system comprises nickel oxide and MgO as a grain growth inhibitor. The oxides comprised in the first system do not interact with the nickel oxide of the second system during the sintering, contrary to the composition forming the anode support layer and/or anode layer of the present invention.

US-A1-2003/0235752 relates to a fuel cell assembly comprising nickel-based anodes. To prevent repeated anode oxidation, oxygen getter devices containing oxygen-gettering materials such as nickel foam, a nickel wire or a nickel mesh, are provided in the fuel passageways leading to and from the anodes. Oxidation of the oxygen-gettering materials is readily reversed through reduction by fuel when the assembly is restarted.

U.S. Pat. No. 6,048,636 discloses an electrode for a fuel cell which has a porous self-supporting layer and another layer with catalytic properties disposed on the self-supporting layer. Said self-supporting layer consists of a cermet comprising $Al_2O_3$ or $TiO_2$, to which nickel is admixed (This relates only to a cell support and does not contain any ionic conducting material (Zirconia or Ceria).

WO-A1-2004/013925 relates to a material suitable for use in a solid oxide fuel cell, especially an anode thereof, comprising an optionally doped double perovskite oxide material, and further discloses a SOFC comprising said material.

US-A1-2003/0035989 relates to a SOFC which comprises a solid electrolyte comprised of an electronic insulator which allows transfer of anions, a ceramic metal composite anode and a cathode. In order to overcome the problems associated with the presence of complex organic sulphur compounds in a hydrocarbon fuel stream for use in a fuel cell without increasing fuel-processing complexity, a porous copper cermet or copper-nickel-alloy cermet is provided by obtaining a sintered nickel cermet, leaching at least a part of the nickel, thereby increasing the porosity of the cermet, and adding Cu back into the pore structure.

WO-A2-2004/030130 relates to a high temperature fuel cell system comprising an anode channel, an anode inlet and an anode outlet, a first anode channel portion proximal to the anode inlet, a second anode channel portion proximal to the anode outlet, and a gas separation means operable to enrich a first gas component of an anode exhaust gas exiting the anode outlet to produce a first product gas enriched in the first gas component. The first anode channel portion comprises an anode material that is resistant to carbon deposition and active for direct oxidation of hydrogen, and at least one hydrocarbon fuel or mixtures thereof. The second anode channel portion comprises an anode material that is catalytically active for steam reforming of at least one hydrocarbon.

However, while most of the suggested anode structures for a SOFC do not prevent coarsening of nickel particles at all, the proposed addition of MgO for coarsening prevention disadvantageously destabilizes the SOFC due to an increase of the thermal expansion coefficient differential between the anode and electrolyte layer.

OBJECT OF THE PRESENT INVENTION

In view of the prior art, it is the object of the present invention to provide a solid oxide fuel cell comprising an anode with improved tolerance towards redox cycling, and a method of producing said solid oxide fuel cell.

BRIEF DESCRIPTION OF THE INVENTION

Said object is achieved by a method of producing a solid oxide fuel cell, comprising the steps of:
forming an anode support layer;
applying an anode layer on the anode support layer;
applying an electrolyte layer on the anode layer; and
sintering the obtained structure;
wherein the anode support layer and/or the anode layer comprises a composition comprising doped zirconia, doped ceria and/or a metal oxide with an oxygen ion or proton conductivity, NiO and at least one oxide selected from the group consisting of $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof.

Said object is further achieved by a solid oxide fuel cell comprising:
an anode support layer;
an anode layer;
an electrolyte layer; and
a cathode layer,
wherein at least the anode support layer and/or anode layer comprises a composition comprising doped zirconia, doped ceria and/or a metal oxide with an oxygen ion or proton conductivity, NiO and at least one oxide which is selected from the group consisting of $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof.

Said object is also achieved by a method of producing a SOFC cell comprising a redox stable SOFC anode and an anode support, characterised by the following processing steps:
tape-casting of an anode support layer;
spray painting of an anode layer on the anode support layer;
spray painting of an electrolyte layer on the anode layer;
sintering of the three-layered structure;
spray painting of an active cathode on the sintered three-layered structure;
sintering the cathode.

Said object is finally achieved by a method of producing a solid oxide fuel cell, comprising the steps of:
forming an anode support layer;
applying an anode layer on the anode support layer;
applying an electrolyte layer on the anode layer; and
sintering the obtained structure;
impregnating at least the anode support layer with a composition comprising a at least one oxide or precursor thereof which is selected from the group consisting of $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof;
wherein the anode support layer and/or the anode layer comprises a composition comprising doped zirconia, doped ceria and/or a metal oxide with an oxygen ion or proton conductivity.

Preferred embodiments are set forth in the subclaims.

DETAILED DESCRIPTION OF THE INVENTION

The method according to the present invention comprising the steps of:
forming an anode support layer;
applying an anode layer on the anode support layer;
applying an electrolyte layer on the anode layer; and
sintering the obtained structure;
wherein the anode support layer and/or the anode layer comprises a composition comprising doped zirconia, doped ceria and/or a metal oxide with an oxygen ion or proton conductivity, NiO and at least one oxide selected from the group consisting of $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof.

Advantageously, the ceramic electrolyte based anode microstructures, i.e. Ni-zirconia, Ni-ceria, or any other metal oxide with oxygen ion or proton conductivity, for example. $La(Sr)Ga(Mg)O_{3-\delta}$, $SrCe(Yb)O_{3-\delta}$, $BaZr(Y)O_{3-\delta}$ or the like, which have the property of being able to withstand redox cycling better than hitherto known anodes, are obtained by a combination of a stabilisation of nickel-surfaces to prevent coarsening and an enhanced mechanical strength of the ceramic backbone.

The present invention primarily concerns a combination of: a) a modification of the Ni-cermet structure that impedes the surface diffusion of Ni on Ni surfaces and prevents the movement of Ni grain boundaries, and b) an enhancement of the mechanical strength by controlling the sintering process by the use of sintering additives and a reduction of the TEC mismatch between the anode and electrolyte by the addition of low TEC oxides.

The surface passivation of Ni-surfaces is achieved by the composition comprising at least one additional oxide that is stable both under SOFC anode and cathode conditions, e.g. $Al_2O_3$, $TiO_2$, $Cr_2O_3$, $Sc_2O_3$, $VO_x$, $TaO_x$, $MnO_x$, $NbO_x$, $CaO$, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof.

Preferably, the at least one oxide of the composition is selected from the group consisting of $TiO_2$, $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof, more preferable from the group consisting of $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof. Most preferred are $TiO_2$ and $Cr_2O_3$.

If, for example, $TiO_2$ or $Cr_2O_3$ is used, $NiTi_2O_4$ and $NiCr_2O_4$ are formed in the anode respectively anode support layer during the sintering step. A redox stable microstructure is created during the initial reduction of the anode composition, leaving a percolating Ni structure with randomly distributed fine $TiO_2$ particles (on average about 1 micrometer). The $TiO_2$ particles will further decrease the Ni grain growth during operation of the cell. Similarly, the reduction of $NiCr_2O_4$ in the anode support will result in a partly surface coverage of the Ni particles and thereby stabilize the structure.

The addition of the oxides furthermore preferably results in a decrease of the thermal extension coefficient of the anode respectively anode support layer, which in turn strengthens the overall mechanical stability of the layers and the resulting cell. Preferred oxides therefore are $Cr_2O_3$, $TiO_2$, $Al_2O_3$, and $Sc_2O_3$.

The amount of NiO in the composition is preferably in the range of about 45 to 75 weight %, based on the total weight of the composition, and more preferred in the range of from about 50 to 65 wt %.

The amount of doped zirconia, doped ceria and/or a metal oxide with an oxygen ion or proton conductivity in the composition is preferably in the range of about 25 to 55 weight %, based on the total weight of the composition, and more preferred in the range of from 40 to 45 wt %.

As a preferred material, $Zr_{1-x}M_xO_{2-\delta}$, may be used, which M=Sc, Ce, Ga or combinations thereof. Y may also be included. X is in the range of about 0.05 to about 0.3. Also preferred $Ce_{1-x}M_xO_{2-\delta}$, M=Ca, Sm, Gd, Y and/or any Ln element, or combinations thereof. X is in the range of about 0.05 to about 0.3.

The amount of the at least one oxide in the composition is preferably in the range of about 1 to 25 weight %, based on the total weight of the composition, and more preferred in the range of from about 2 to 10 wt %.

In a further preferred embodiment, the composition additionally comprises an oxide selected from the group consisting of $Al_2O_3$, $CO_3O_4$, $Mn_3O_4$, $B_2O_3$, CuO, ZnO, $Fe_3O_4$, $MoO_3$, $WO_3$, $Ga_2O_3$, and mixtures thereof. The amount thereof the composition is preferably in the range of about 0.1 to 5 weight %, based on the total weight of the composition, and more preferred in the range of from 0.2 to 2 wt %. The additional oxides are used as sintering aids to facilitate the reaction during the sintering step.

Pore formers may be added to the composition in order to obtain a porous anode support and/or anode layer. The porosity of the layer can be designed by the respective amount of pore formers, depending on the desired application.

In the method of the present invention, the anode support layer formed in the first step may be preferably formed by tape-casting. However, other methods well known to the skilled person may be used as well.

After the formation of the anode support layer, the anode layer is applied thereon, preferably by spray painting. Next, the electrolyte layer is applied on the anode layer, also preferably by spray painting.

The so formed multi-layer structure, comprising the anode support layer, the anode layer and the electrolyte layer, is dried and then sintered. Preferred sintering temperatures are form about 900 to about 1500° C., more preferred form about 1000 to about 1400° C.

In a further preferred embodiment of the invention, the method comprises the additional step of applying a cathode layer on the above-described sintered structure, for example by spray-painting. In a final step, the multi-layer structure, including the cathode layer, is then sintered to obtain a solid oxide fuel cell.

The thickness of the anode support layer is preferably in the range of from about 300 to 700 μm. The thickness of the anode layer is preferably in the range of from about 10 to 40 μm. Furthermore, the thickness of the electrolyte layer is preferably in the range of from about 10 to 40 μm. Moreover, the thickness of the cathode layer is preferably in the range of from about 10 to 30 μm.

The present invention also provides a method of producing a SOFC cell comprising a redox stable SOFC anode and an anode support, characterised by the following processing steps:
tape-casting of an anode support layer;
spray painting of an anode layer on the anode support layer;
spray painting of an electrolyte layer on the anode layer;
sintering of the three-layered structure;
spray painting of an active cathode on the sintered three-layered structure;
sintering the cathode.

The preferred embodiments described further above with regard to the specific layers and composition thereof of course also apply to this method of the present invention.

The present invention furthermore provides a method of producing a solid oxide fuel cell, comprising the steps of:
forming an anode support layer;
applying an anode layer on the anode support layer;
applying an electrolyte layer on the anode layer; and
sintering the obtained structure;
impregnating at least the anode support layer with a composition comprising a at least one oxide or precursor thereof which is selected from the group consisting of $Al_2O_3$, $TiO_2$, $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof;
wherein the anode support layer and/or the anode layer comprises a composition comprising doped zirconia and/or doped ceria.

Preferably, the at least one oxide or precursor thereof is selected from the group consisting of $TiO_2$, $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof. More preferred, the at least one oxide or precursor thereof is selected from the group consisting of $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof.

The oxide precursor may preferably be a metal salt which is soluble in aqueous or organic solvents, such as metal sulfates, nitrates or the like. Metal salts comprising organic anions may be used as well.

After sintering, the multi-structure may preferably be impregnated with $(Sr,La)ZrO_3$ or another SrO and $La_2O_3$ source, such as $(La,Sr)(Cr,V)O_3$. In this case, the following reaction takes place during the reduction of the anode: $H_2 + NiTiO_3 + (SrLa)ZrO_3 = Ni + (SrLa)TiO_3 + ZrO_2 + H_2O(g)$.

The so provided (SrLa)TiO$_3$ provides catalytic activity as well as electronic conductivity.

In a further preferred embodiment of the invention, the method comprises the additional step of applying a cathode layer on the above-described sintered structure after impregnation, for example by spray-painting. In a final step, the multi-layer structure, including the cathode layer, is then sintered to obtain a solid oxide fuel cell.

The present invention moreover provides a solid oxide fuel cell comprising:
- an anode support layer;
- an anode layer;
- an electrolyte layer; and
- a cathode layer, wherein at least the anode support layer and/or anode layer comprises a composition as described above.

Prior to operation the anode is activated by reduction of NiO particles. During said reduction, the additional oxides will either partly cover the Ni surfaces (e.g. $Cr_2O_3$), or will be present as discrete particles in close contact with the nickel structure (e.g. $TiO_2$). In both cases Ni grain growth is impeded and the Ni structure is thus stabilized.

The transformation of NiO to Ni upon reduction implies a volume reduction of about 25% of the nickel phase. For spherical particles this corresponds to a radius reduction of 9%. The YSZ-phase however remains unaffected by the reduction process. The stability of the YSZ network is believed to cause the stable dimensions during the first reduction.

According to the invention, a combination of nickel coarsening prevention due to specific Ni-particle growth inhibitors, and, at the same time, a strengthening of the ceramic structure of the anode support layer and/or the anode layer is achieved. Coarsening of the Nickel structure will thus be limited, resulting in improved redox stability of the microstructures, which in return improves the robustness of the SOFC system as a whole. Further, the degradation of the electrical performance is limited, also contributing to a prolonged lifetime of the solid oxide fuel cell.

The invention will now be illustrated by means of the following examples. Alternative embodiments and examples exist without departing from the scope of the present invention.

EXAMPLES

Example 1

A SOFC cell comprising a redox stable SOFC anode and anode support structure was obtained via the following processing steps:
1. tape-casting an anode support layer;
2. spray painting an active anode layer on the anode support layer;
3. spray painting an electrolyte layer on the anode layer;
4. sintering of the 3-layered structure;
5. spray painting an active cathode on the sintered 3-layered structure; and
6. sintering of the cathode.

A slurry for the anode support was made by dispersing powders of NiO and 3-mole yttria stabilized zirconia in a weight ratio within the range of 55 weight % NiO and with an addition of 5 weight % $Cr_2O_3$. A binder was added after dispersion and the slurry tape-cast. The dried thickness of the tape was about 500 μm.

The slurry for the active anode comprised NiO and 8-mole yttria stabilized zirconia in a weight ratio within the range of 53 weight % NiO and with an addition of 7 weight % $TiO_2$. This slurry was manufactured similarly to the anode support slurry. After spray painting of an about 15 μm thick layer and drying, an 8-mole yttria stabilized zirconia electrolyte with a thickness of around 10 μm was deposited onto the anode layer. The package was sintered in air at 1300° C. The cathode layer was subsequently deposited by spray painting and the cell was sintered according to the composition.

During sintering of the anode and electrolyte, $NiTi_2O_4$ and $NiCr_2O_4$ were formed in the anode structure and anode support, respectively. The redox stable microstructure was created during the initial reduction of the anode leaving a percolating Ni structure with randomly distributed fine $TiO_2$ particles (~1 μm). The $TiO_2$ particles decreased the Ni grain growth during operation. Similarly the reduction of $NiCr_2O_4$ in the anode support resulted in a partly surface coverage of the Ni particles and thereby stabilized the structure.

The obtained SOFC comprised an anode with an improved redox stability. Furthermore, the cell exhibited a higher mechanical strength due to a better match of TEC of the respective layers.

Example 2

Same method as in Example 1, but with the slurry comprising pre-reacted $NiTiO_3$ before processing.

Example 3

Same method as in Example 1, but with the slurry comprising pre-reacted $NiCr_2O_4$ before processing.

Example 4

Same method as Example 1, but with the slurry comprising a mixture of $TiO_2$ and $Cr_2O_3$ to control the coverage of the nickel surfaces.

Example 5

Same method as Example 1, but with the slurry comprising $Sc_2O_3$ as the added oxide.

Examples 6

Same method as Example 1, but without the addition of surface passivating oxides. After the sintering of the multi-layer structure comprising the anode support, the anode and the electrolyte, the nickel surface passivation is achieved by impregnation with a slurry comprising $Cr_2O_3$ into the anode structure.

Example 7

Same method as Example 1, but without the addition of surface passivating oxides. After the sintering of the multi-layer structure comprising the anode support, the anode and the electrolyte, the nickel surface passivation is achieved by impregnation with a slurry comprising $TiO_2$ into the anode structure.

Example 8

Same method as Example 1, but without the addition of surface passivating oxides. After the sintering of the multi-layer structure comprising the anode support, the anode and the electrolyte, the nickel surface passivation is achieved by impregnation with (Sr,La)ZrO$_3$.

Example 9

Same method as Example 1, but with the addition of NiTiO$_3$ along with an equal molar amount of SrZrO$_3$. During sintering, the following reaction took place. NiTiO$_3$+(SrLa)ZrO$_3$=NiO+(SrLa)TiO$_3$+ZrO$_2$.

Example 10

Same method as Example 1, but with the addition of Al$_2$O$_3$ as a sintering additive.

Example 11

Same method as Example 1, but with doped ceria instead of zirconia.

The present invention further provides in embodiments:
(1) a method of producing a SOFC cell comprising a redox stable SOFC anode and an anode support structure, characterised by the following processing steps:
tape-casting of an anode support;
spray painting of an anode structure on the anode support;
spray painting of an electrolyte on the anode structure;
sintering of the three-layered structure;
spray painting of an active cathode on the sintered three-layered structure;
sintering the cathode.
(2) a method according to (1), wherein a redox stable SOFC anode and anode support structure is provided in which passivation of the Ni structure is combined with a high strength of the ceramic backbone.
(3) a method according to (1), wherein a slurry for the anode support is made by dispersing powders NiO and 3-mole yttria stabilized zirconia, preferably in a weight ratio within the range of 45-75 weight % NiO and with an addition of oxides which are stable under SOFC anode conditions, e.g. Cr$_2$O$_3$, TiO$_2$, Al$_2$O$_3$, Sc$_2$O$_3$, VO$_x$, TaO$_x$, MnO$_x$, NbO$_x$, CaO, Bi$_2$O$_3$, LnO$_x$ (or mixtures or compounds thereof).
(4) a method according to (1) wherein sintering additives are added, such as Al$_2$O$_3$, CO$_3$O$_4$, Mn$_3$O$_4$, B$_2$O$_3$, CuO, ZnO, V$_2$O$_5$, Cr$_2$O$_3$, Fe$_3$O$_4$, MoO$_3$, WO$_3$, Ga$_2$O$_3$ or combinations thereof.
(5) a method according to at least one of (1) to (4) wherein NiO is reduced prior to activation of the anode.

It should be further apparent to those skilled in the art that various changes in form and detail of the invention as shown and described above may be made. It is intended that such changes be included within the spirit and scope of the claims appended hereto.

The invention claimed is:

1. A method of producing a solid oxide fuel cell, comprising the steps of:
forming a structure by a method comprising
applying an anode layer on an anode support layer; and
applying an electrolyte layer on the anode layer;
sintering the structure;
wherein the anode support layer and/or the anode layer comprises a composition comprising doped zirconia, doped ceria and/or a metal oxide with an oxygen ion or proton conductivity, NiO and at least one oxide selected from the group consisting of VO$_x$, TaO$_x$, MnO$_x$, NbO$_x$, Bi$_2$O$_3$, LnO$_x$, MgCr$_2$O$_4$, MgTiO$_3$, CaAl$_2$O$_4$, LaAlO$_3$, YbCrO$_3$, ErCrO$_4$, NiTiO$_3$, NiCr$_2$O$_4$, and mixtures thereof.

2. The method of claim 1, further comprising the step of applying a cathode layer on the sintered structure.

3. The method of claim 1, wherein the amount of NiO in the composition is in the range of about 45 to 75 wt %, based on the total weight of the composition.

4. The method of claim 1, wherein the composition additionally comprises an oxide selected from the group consisting of Al$_2$O$_3$, Co$_3$O$_4$, Mn$_3$O$_4$, B$_2$O$_3$, CuO, ZnO, Fe$_3$O$_4$, MoO$_3$, WO$_3$, Ga$_2$O$_3$, and mixtures thereof.

5. A solid oxide fuel cell comprising:
an anode support layer;
an anode layer;
an electrolyte layer; and
a cathode layer;
wherein at least the anode support layer and/or anode layer comprises a composition comprising doped zirconia, doped ceria and/or a metal oxide with an oxygen ion or proton conductivity, NiO and at least one oxide which is selected from the group consisting of VO$_x$, TaO$_x$, MnO$_x$, NbO$_x$, Bi$_2$O$_3$, LnO$_x$, MgCr$_2$O$_4$, MgTiO$_3$, CaAl$_2$O$_4$, LaAlO$_3$, YbCrO$_3$, ErCrO$_4$, NiTiO$_3$, NiCr$_2$O$_4$, and mixtures thereof.

6. The method of claim 1 further comprising the following processing steps:
forming a three-layered structure by a method comprising
tape-casting of an anode support layer;
spray painting of redox stable anode layer on the anode support layer; and
spray painting of an electrolyte layer on the anode layer;
sintering of the three-layered structure;
spray painting of an active cathode on the sintered three-layered structure;
sintering the cathode.

7. The method of claim 6, wherein the composition further comprises an oxide selected from the group consisting of Al$_2$O$_3$, Co$_3$O$_4$, Mn$_3$O$_4$, B$_2$O$_3$, CuO, ZnO, Fe$_3$O$_4$, MoO$_3$, WO$_3$, Ga$_2$O$_3$, and mixtures thereof.

8. A method of producing a solid oxide fuel cell, comprising the steps of:
forming a structure by a method comprising
applying an anode layer on an anode support layer;
applying an electrolyte layer on the anode layer; and
sintering the obtained structure;
impregnating at least the anode support layer with a composition comprising at least one oxide or precursor thereof which is selected from the group consisting of VO$_x$, TaO$_x$, MnO$_x$, NbO$_x$, Bi$_2$O$_3$, LnO$_x$, MgCr$_2$O$_4$, MgTiO$_3$, CaAl$_2$O$_4$, LaAlO$_3$, YbCrO$_3$, ErCrO$_4$, NiTiO$_3$, NiCr$_2$O$_4$, and mixtures thereof;
wherein the anode support layer and/or the anode layer comprises a composition comprising doped zirconia, doped ceria and/or a metal oxide with an oxygen ion or proton conductivity, and NiO.

9. The method of claim 8, further comprising the step of applying a cathode layer on the sintered structure.

10. The method of claim 8, wherein the oxide precursor is a metal salt which is soluble in aqueous or organic solvents.

* * * * *